(12) United States Patent
Kuwajima

(10) Patent No.: US 7,342,743 B2
(45) Date of Patent: Mar. 11, 2008

(54) SHOCK-ABSORBING MEMBER, SHOCK-ABSORBING METHOD OF ELECTRONIC DEVICE EMPLOYING THE MEMBER, AND ELECTRONIC DEVICE ADAPTING THE MEMBER AND THE METHOD

(75) Inventor: Hideki Kuwajima, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 421 days.

(21) Appl. No.: 10/812,993

(22) Filed: Mar. 31, 2004

(65) Prior Publication Data

US 2004/0190193 A1    Sep. 30, 2004

(30) Foreign Application Priority Data

Mar. 31, 2003    (JP)    ............................. 2003-094953

(51) Int. Cl.
*G11B 5/012*    (2006.01)
(52) U.S. Cl. ................................. 360/97.02; 360/97.01
(58) Field of Classification Search .................... None
See application file for complete search history.

(56) References Cited

U.S. PATENT DOCUMENTS

| | | | | |
|---|---|---|---|---|
| 4,413,735 A | * | 11/1983 | Little | .......................... 206/523 |
| 5,349,486 A | | 9/1994 | Sugimoto et al. | |
| 5,373,670 A | * | 12/1994 | Sasaki et al. | ............... 52/167.7 |
| 5,379,990 A | * | 1/1995 | Ando et al. | ..................... 267/34 |
| 5,582,429 A | * | 12/1996 | Heinz et al. | ............. 280/743.2 |
| 5,745,471 A | * | 4/1998 | Son et al. | .................... 720/694 |
| 5,882,776 A | * | 3/1999 | Bambara et al. | ............. 428/215 |
| 5,958,212 A | | 9/1999 | Yamamura et al. | |
| 6,166,901 A | | 12/2000 | Gamble et al. | |
| 6,304,440 B1 | | 10/2001 | Lin | |
| 6,496,362 B2 | * | 12/2002 | Osterhout et al. | ........... 361/685 |
| 6,559,383 B1 | * | 5/2003 | Martin | ..................... 174/84 R |
| 6,567,265 B1 | * | 5/2003 | Yamamura et al. | ......... 361/685 |

(Continued)

FOREIGN PATENT DOCUMENTS

EP    0 715 308 A2    6/1996

(Continued)

OTHER PUBLICATIONS

English Machine Translation of Yamamura et al. (JP 09-204766).*

*Primary Examiner*—Angel Castro
*Assistant Examiner*—Christopher R. Magee
(74) *Attorney, Agent, or Firm*—McDermott Will & Emery LLP

(57) ABSTRACT

Shock-absorbing member 18, a shock-absorbing method and an electronic device employing the member are disclosed, wherein the shock-absorbing member prevents electronic equipment main body from receiving a large shock and avoids a fatal damage to the equipment, even when the equipment is subjected to substantially a large impact of dropping of the equipment for instance. More specifically, shock absorbing member 18 is formed by integrally molding shock-absorbing base part 18a of resin material having a flexibility but having a certain degree of hardness and formed into a thin plate, and highly soft shock-absorbing base part 18a having a cushion capability, into a unit having a certain degree of thickness, wherein shock-absorbing base part 18a is thinner than shock-absorbing flexible part 18b, wherein shock-absorbing base part 18a bends when receiving an impact, and start absorbing the shock by buckling at a bending part thereof. Shock-absorbing member 18 is disposed on and fixed to electronic equipment main body, constituting the invention.

26 Claims, 10 Drawing Sheets

U.S. PATENT DOCUMENTS

| | | |
|---|---|---|
| 6,751,092 B1 * | 6/2004 | Ohnishi et al. ............. 361/685 |
| 2002/0043608 A1 | 4/2002 | Nakata et al. |
| 2002/0167792 A1 | 11/2002 | Osterhout et al. |

FOREIGN PATENT DOCUMENTS

| | | |
|---|---|---|
| EP | 0 917 036 A2 | 5/1999 |
| JP | 63-76628 | 5/1988 |
| JP | 3-241583 | 10/1991 |
| JP | 9-204766 | 8/1997 |
| JP | 11-242881 | 9/1999 |
| WO | WO 99/06902 | 2/1999 |
| WO | WO 01/33103 A1 | 5/2001 |

* cited by examiner (a)

Directional View from A       Directional View from B

SHOCK-ABSORBING MEMBER, SHOCK-ABSORBING METHOD OF ELECTRONIC DEVICE EMPLOYING THE MEMBER, AND ELECTRONIC DEVICE ADAPTING THE MEMBER AND THE METHOD

TECHNICAL FIELD OF THE INVENTION

The present invention relates to a shock-absorbing member, a shock-absorbing method using the absorbing member, and an electronic device adapting the member and the method, with the shock-absorbing member absorbing a shock applied to a disk type recording/reproducing device such as magnetic disk drive and optical disk drive recording and reproducing information in high density (hereinafter called a disk drive) and to other electronic devices used as portable equipment.

BACKGROUND OF THE INVENTION

Recently, electronic equipment such as a disk drive has been increasingly reduced in size and weight, and such electronic equipment is increasingly used as portable equipment. With this trend, chances for such portable electronic equipment to receive great shocks caused by dropping during its portable usage are also increasing. With further advancement of reduction in size and weight of devices, dropping height of a device during carriage tends to become high, accordingly the shock given to the device is becoming still greater.

Hereinafter, a conventional shock-absorbing member and a shock-absorbing method of an electronic device is described using drawings.

FIG. 9 is a drawing which helps describing a shock-absorbing member and a shock-absorbing method for a conventional electronic device. FIG. 9 (a) is a perspective view showing a shock-absorbing member which is fixed onto a main body of an electronic device, and FIG. 9 (b) is a schematic cross-sectional view illustrating that an outer case is fixed to a main body of an electronic device through the shock-absorbing member.

FIG. 9 illustrates that shock-absorbing members 62 made of such as a sponge cushion are affixed to every six surfaces, top, bottom, right, left, front and back, of the main body of electronic device 61 such as a disk drive, and that outer case 71 is fitted to outsides of the main body through shock-absorbing members 62, thereby forming electronic device 72. When electronic device 72 receives shocks by such as dropping of the device, shock-absorbing members 62 cushions a force of impact.

Shock-absorbing members composed of a plurality of materials having a different shock-absorbing characteristic are proposed, (for example, in Japan Patent Laid-Open Application Nos. JP03241583 and JP11242881). FIG. 10 (a) shows an example of a vibration-isolating mechanism in which a vibration-isolation characteristic in a wide temperature range is realized by combining different materials each having an appropriate damping characteristic for respective temperature zone, and which is applied to a magnetic disk drive. In this example, first shock-absorbing member 121 having a suitable damping characteristic for a lower operating temperature zone and second shock-absorbing member 122 having a proper damping characteristic or a higher temperature zone are integrally jointed with an adhesive agent, forming shock-absorbing rubber vibration-isolator 102. As is shown in FIG. 10 (a), an enclosure of electronic device 101 containing and sealing constituents such as a magnetic disk drive, a magnetic head and a positioning mechanism is supported to frame 103 with shock-absorbing rubber vibration-isolators 102 placed in four places between the enclosure and the frame, establishing the vibration-isolating mechanism. In this constitution, first shock-absorbing member 121 having an appropriate damping characteristic for the temperature suspends electronic device 101 when temperature is in lower side of an operating temperature, and when the ambient temperature rises to a higher side of the operating temperature, second shock-absorbing member 122 supports electronic device 101 with its appropriate damping characteristic for the temperature, therewith resistivity of electronic device 101 against disturbance from outside is improved in a wide temperature range.

FIG. 10 (b) shows another example of the vibration-isolating mechanism, in which a plurality of shock-absorbing members which absorbs vibration and impact are placed between a disk drive and a case covering a disc drive container of the electronic equipment. In FIG. 10 (b), 3 pieces each of soft first-shock-absorbing divided into a small piece are affixed to sheet member 141 which is bonded to the electronic equipment along two long sides of the face of sheet member 141 facing the case (not illustrated), and then second-shock-absorbing member 412 which is harder than first-shock-absorbing-member 411 is placed between first-shock-absorbing-members 411. A thickness of newly attached shock-absorbing member 412 is set almost equal to a thickness where first-shock-absorbing member 411 loses its shock-absorbing effect compressed by an impact force. When a weak impact is applied, only soft first-shock-absorbing member 411 absorbs the shock, and when a strong impact is applied, hard second-shock-absorbing member 412 provided with an additional shock absorbing capability absorbs a shock which soft shock-absorbing-member 411 is unable to absorb with its capability, therewith two stages absorption construction is established. In this example, both of the shock-absorbing members absorb respective shock by elastically deforming. It is therefore assumed that this construction effectively responds to a wide range of impact from a weak impact to a strong impact.

However, with the above conventional shock-absorbing member and shock-absorbing method, when shock-absorbing member 62 made of a single material as shown in FIG. 9 is used, and when a large dropping impact for instance reaching 10,000 G or higher is applied, a thickness of every shock-absorbing member 62 has to be large enough for efficiently alleviating the impact and protecting electronic device main body 61 from fatal damage. Not withstanding, if the thickness of shock-absorbing member 62 is increased, although shock-absorbing capability of shock-absorbing member 62 becomes high enough at an initial stage of receiving an impact, deformation of shock-absorbing member 62 is rapidly progressed and resilient restoring power of shock-absorbing member 62 rapidly progresses, and as a result, the shock-absorbing capability is swiftly decreased and the shock-absorbing capability of the member is dropped, causing the device subjected to a great shock in relatively short period of time. Thus, a task is left. There also is another problem left that increasing the thickness of shock-absorbing member 62 makes the size of electronic device 72 larger, making it hard for the device to realize further miniaturization.

The problem of above mentioned single material shock-absorbing member remains in a constitution in which a plurality of shock-absorbing members are combined and used, i.e., even if a plurality of shock-absorbing member having a different temperature characteristic are combined and used as in FIG. 10 (a), because the problem is irrelevant to temperature. Namely, even if the thickness of the shock-absorbing member is increased against a large dropping impact amounting to 10,000 G or above, although the shock-absorbing capability becomes high at the initial stage of receiving the impact, the shock-absorbing member is rapidly deformed, and loses its resiliency restoring capability therefore a shock-absorbing capability of the member is lowered, as a result, the device is subjected to receiving a great shock in a relatively short period of time. Thus, it has been difficult for them to cope with a very large impact. If the soft first shock-absorbing member and the second shock-absorbing member that is harder than the first member are combined and used as in case of FIG. 10 (b), it may be considered that the united member is more effective than the single member shock-absorbing member in alleviating the impact. However, if substantially a large dropping impact reaching 10,000 G or above is applied, even if the hard second-shock-absorbing-member is used, as long as it is used for absorbing the shock only with its elasticity deforming resistivity, it has to be assumed that it will be difficult for the united member to alleviate the impact force effectively and avoid a fatal damage to electronic device main body 61.

DISCLOSURE OF THE INVENTION

The present invention is intended to solve the above problems and to provide a shock-absorbing member, a shock-absorbing method of an electronic device, and an electronic device using the member and the method, with which a main body of equipment is prevented from receiving a large shock, a fatal damage is avoided, and normal function is ensured when the device is subjected to substantially a large impact by dropping or the like.

In order to achieve above objective, the shock-absorbing member in the present invention, which is placed around the main body of the device, is composed of a shock-absorbing base part and a shock-absorbing flexible part, and in which the shock-absorbing base part is made thinner than the shock-absorbing flexible part. When the shock-absorbing base receives a shock, the base part first starts bending by absorbing the shock, in this case the shock-absorbing base part forms a bending part which is vertical to the shock direction, and starts buckling at the bending part of the shock-absorbing base part so as to absorb a shock when receiving an impact. The member is so constituted that longer sides of the shock-absorbing base part and the shock-absorbing flexible part are directed substantially in parallel with a direction in which an impact force is applied, that the shock-absorbing base part and the shock-absorbing flexible part are integrally composed forming a unit, that the shock-absorbing base part is narrower in its effective width of the bending part in vertical to the direction of the length, that the shock-absorbing base part is thinner in a direction of its effective thickness which is vertical to long side of the shock-absorbing base part, and that the shock-absorbing base part is harder than the shock-absorbing flexible part.

With these constitutions, the shock-absorbing member is constituted as to endure a compressional force of impact for comparatively a longer period of time, to display its shock-absorbing capability fully when receiving a very large shock such as of dropping of the device in portable use. Used in electronic equipment, the shock-absorbing member prevents a main body of the equipment from being applied a large impact force and avoids a fatal damage to the equipment.

In order to achieve above objective, the shock-absorbing method of electronic devices of this invention includes, in the shock-absorbing method of the electronic device utilizing the shock absorbing member made by integrally molding the shock-absorbing base part and the shock-absorbing flexible part, a process of making the shock-absorbing member to start buckling at its bending part, as well as the process of making the thickness of the shock-absorbing base part smaller than that of the shock-absorbing flexible part thereby having the shock-absorbing base part to absorb the shock first by bending when receiving an impact. The method thereby includes a process having the shock-absorbing flexible part to mainly absorb the shock after the shock-absorbing base part is buckled at a bending part which is vertical to the shock direction so as to absorb the shock. With these processes, the obtained shock-absorbing method enables the electronic device to sustain a compressional force for comparatively a long time when receiving a large impact at its portable use, thereby preventing the electronic device from receiving a fatal damage.

In addition to above, the shock-absorbing method of the electronic device of this invention includes a process, in which a joint plane of the shock-absorbing base part and the shock-absorbing flexible part of the shock-absorbing members placed adjacent to a plane to which a main body of a device and an outer case face, is vertically angled to the plane, 60° at least and 120° at most. With this process, much preferable disposition of the shock-absorbing member is realized so that the shock-absorbing member receiving a shock buckles in near center of the shock-absorbing base part, making it possible for the shock-absorbing method sufficiently to display the shock-absorbing charactereistic.

In order to achieve the objective of this invention, the electronic device of the present invention further includes following constitutions. In the shock-absorbing member which is paced outside of the main body of the device and which is composed of the shock-absorbing base part and shock-absorbing flexible part, the thickness of the shock-absorbing base part is thinner than that of the shock-absorbing flexible part; the bending of the shock-absorbing part of the shock-absorbing base part is followed by buckling of the part; the longer sides of the shock-absorbing member of the shock-absorbing base part and the shock-absorbing flexible part are directed substantially in parallel with a direction in which the impact force is applied. The shock-absorbing member used here is made by integrally molding the shock-absorbing base part and the shock-absorbing flexible. In the shock-absorbing member, the bending part in vertical to the long sides of the shock-absorbing base part is narrower in effective width. In the shock-absorbing member, the bending part in vertical to the long sides of the shock-absorbing base part is thinner in effective thickness. In the shock-absorbing member, the shock-absorbing base part is harder than the shock-absorbing flexible part. At least three pieces of shock-absorbing members are placed between the plane to which the main body of the device and the outer member face. The shock-absorbing member is placed between the plane to which the main body of the device and the outer member face, and the joint plane of the shock-absorbing base part and the shock-absorbing flexible part of the shock-absorbing member placed adjacent to the plane to which the main body of the device and the outer case face, is vertically angled to the joint plane 60° at least and 120° at most. The shock-absorbing member is affixed to one of the outside face of the main body of the device and the inside face the outer case. The shock-absorbing member is in one of shapes of cuboid, cylinder, half-cylinder, oval cylinder, half-oval cylinder, and polygonal prism, and the plane of the shock-absorbing member having the shock-absorbing base part is in parallel with the joint plane. The plane of the shock-absorbing member having the shock-absorbing base part is on a boundary of the shock-absorbing member, and an outside peripheral diameter or an outside perimeter of the shock-absorbing base part is smaller than half of an outside peripheral diameter or an outside perimeter of the shock-absorbing member Because the electronic device of the present invention is manufactured in accordance with above-mentioned shock-absorbing method incorporating the constitutions, the device is provided with substantially a large shock-absorbing capability even for a severe shock which may be caused by such as dropping of the device in portable use, therewith the main body of the electronic equipment is prevented from receiving a large shock avoiding a serious damage, and reliability of the device is increased high.

BRIEF DESCRIPTION OF THE DRAWINGS

FIG. 2 (b) is a side view illustrating a shock-absorbing process of the shock-absorbing member in the preferred embodiment of the present invention.

FIG. 2 (c) is a perspective view of a shock-absorbing member in other constitution to be used for a magnetic disk drive in the preferred embodiment of the present invention.

FIG. 6 (b) is a schematic side view illustrating an example of a method for examining effects of shock-absorbing by using an arrangement of shock-absorbing members in the preferred embodiment of the present invention.

FIG. 9 (b) is a schematic cross-sectional view showing an outer case is fixed to an electronic device main body in conventional electronic equipment.

FIG. 10 (b) shows an arrangement of other conventional shock-absorbing members absorbing a vibration and a shock in electronic equipment.

DETAILED DESCRIPTION OF TH INVENTION

An exemplary embodiment of the present invention is described hereinafter using the drawings.

PREFERRED EMBODIMENT OF INVENTION

Figure 1:
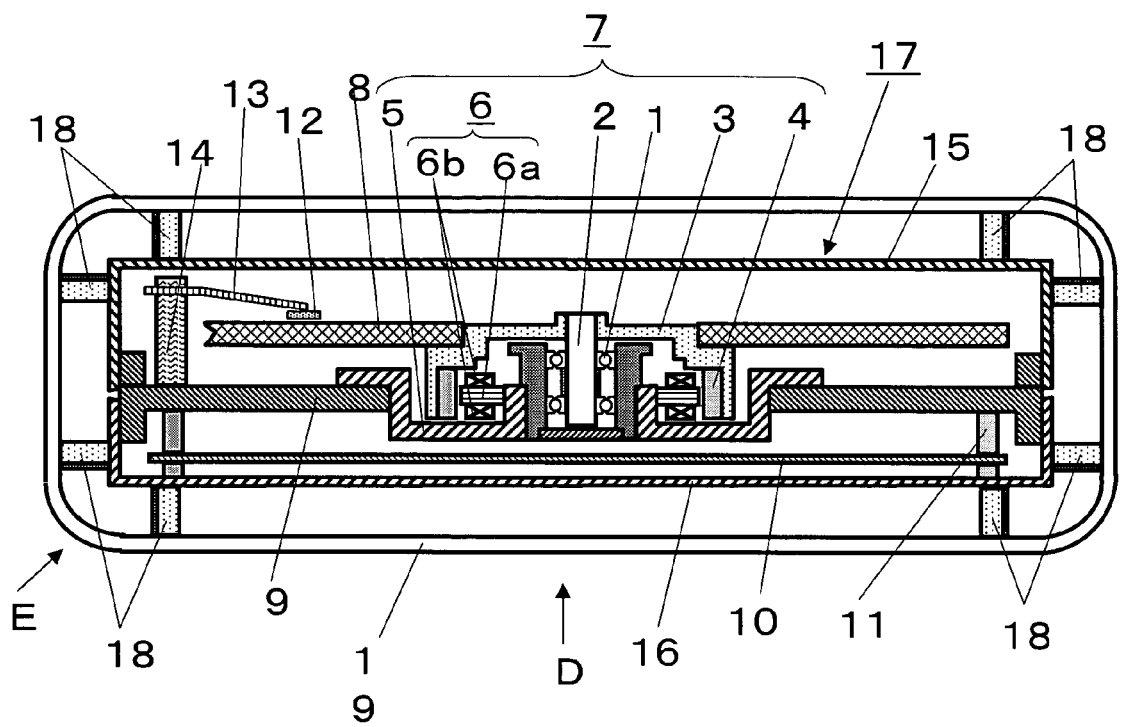
FIG. 1 is a schematic cross-sectional view showing a structure of main part of a disk drive having a shock-absorbing constitution in the preferred embodiment of the present invention.

FIG. 1 is a schematic cross-sectional view showing a structure of main part of a disk drive having a shock-absorbing constitution, which is used here for explaining a shock absorbing method of electronic equipment in the preferred embodiment of the present invention. Explanation of electronic equipment will be made quoting a magnetic disk drive.

In FIG. 1, rotary magnet 4 magnetized to a plurality of magnetic poles is fixed to a lower inside-face of an outer periphery of rotor hub 3 by press-fitting, bonding or other well-known method. Rotor hub 3 is fixed to rotary shaft 2 rotatably supported by bearing 1. Stator 6 is fixed onto motor chassis 5 facing an inner peripheral face of rotary magnet 4, with stator 6 provided with stator core 6a having a plurality of pole-tooth parts, and each pole-tooth part is wound up by coil 6b. When current is supplied to coil 6b, a rotational driving force is generated at the rotary magnet 4 rotating rotor hub 3. Spindle motor 7 is thus constituted.

Magnetic disk 8 is placed on top of a flange of rotor hub 3 rotating with rotor hub 3.

Spindle motor 7 placing magnetic disk 8 thereon is fixed to substrate 9 of the magnetic disk drive. Circuit board 10 incorporating electronic circuits which are required for equipment, such as a rotational control circuit driving and controlling rotation of spindle motor 7 and a signal-processing circuit recording signal on and reproducing the signal from magnetic disk 8 is fixed to the substrate through support member 11. Suspension 13 a rocking means for positioning magnetic head 12 onto a prescribed trucking position of the magnetic disk 8 is fixed to substrate 9 through column 14 so that magnetic head 12 faces a surface of magnetic disk 8. The magnetic head is a signal conversion element recording or reproducing signals on magnetic disk 8.

Upper inner case 15 and lower inner case 16 are fixed to an outer edge of substrate 9 at a portion where substrate 9 is turned upward or downward, thereby magnetic disk drive main body 17 is formed.

Four each shock-absorbing members 18 are fixed onto every six outside faces of magnetic drive main body 17 enclosed by upper inner case 15 and lower inner case 16, and shock-absorbing member 18 abut inside face of outer case 19 which is placed outside the main body, thereby forming the magnetic disk drive equipment. The number of shock absorbing member 18 fixed onto 6 outside faces of magnetic disk drive main body 17 is not limited only to four pieces each, and three pieces are allowed at the least case. Magnetic disk drive main body 17 may not be necessarily enclosed by upper inner case 15 and lower inner case 16 and shock-absorbing member 18 may be directly fixed to substrate 9 which is turned at the end.

Figure 2:
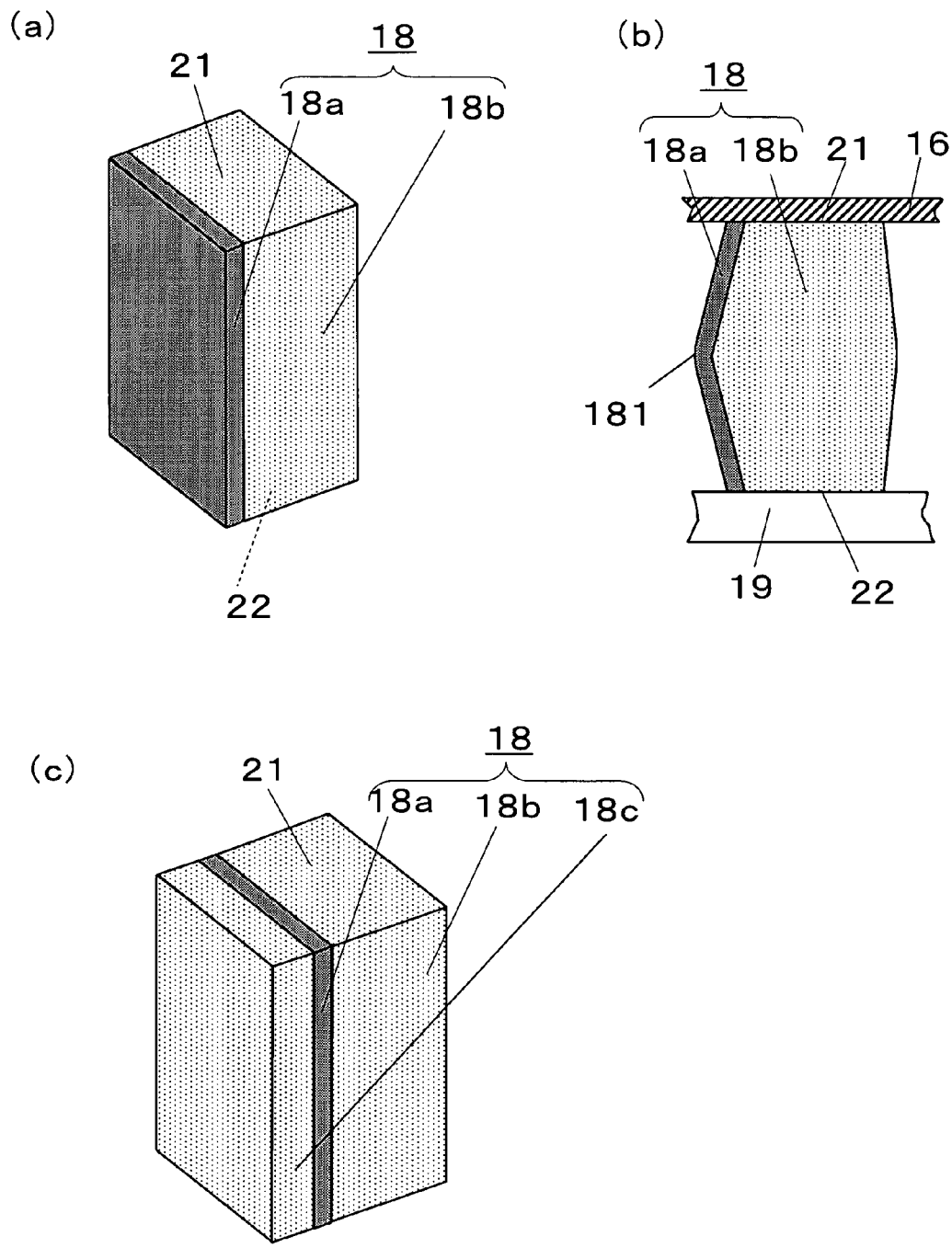
FIG. 2 (a) is a perspective view of a shock-absorbing member to be used for the magnetic disk drive in the preferred embodiment of the present invention.

Next, shock absorbing member 18 is explained using FIG. 2. FIG. 2 (a) is a perspective view of shock absorbing member 18, and FIG. 2 (*b*) is a side view of the shock-absorbing member showing shock absorbing process of the member. Shock-absorbing member 18 in FIG. 2 (*a*) is prepared with a commercially available shock-absorbing material used as a shock-absorbing sheet and cut into a specified size. As the shock-absorbing sheet, a composite member of shock-absorbing base part 18*a*, a thin plate sheet of a flexible resin material provided with a certain level of hardness such as polyethylene, and a shock absorbing flexible part 18*b*, a very flexible material provided with a cushioning effect, integrally molded one on the other into a unit having a certain thickness can be utilized.

In a space between inner case made up of upper case 15 and lower case 16, i.e., magnetic disk drive main body 17, and outer case 19 in FIG. 1, end faces 21 and 22 facing with each other and vertical to a joint plane in FIG. 2(*a*) made by shock-absorbing base part 18*a* and shock-absorbing flexible part 18*b* putting one on the other and integrally molding, are respectively abutted to the outside face of magnetic disk drive main body 17 and the inside face of outer case 19. In this state, end face 21 one of the end faces of shock absorbing member 18 is affixed to one of upper inner case 15 and lower inner case 16, i.e., the outside face of magnetic disk drive main body 17 with bond for instance, and another end face 22 is fixed to the inside surface of outer case 19 but is not bonded and is kept in a free state. Shock absorbing member 18 can be optionally affixed to the inside surface of outer case 19 and be freed at the outer face of magnetic disk drive main body 17, or it can be affixed to both of the inside surface of outer case 19 and the outside face of magnetic disk drive main body 17.

In this way, shock-absorbing member 18 is formed by integrally molding shock-absorbing base part 18*a* having a certain level of hardness, and shock absorbing flexible part 18*b* very flexible and having a cushioning capability, and shock absorbing base part 18*a* and shock absorbing flexible part 18*b* both receive a shock in parallel fashion in this constitution The thickness of the shock absorbing portion of the shock absorbing member 18 (that is, distance between end face 21 and end face 22 of shock-absorbing member 18) is formed into a proper size. With this constitution, when receiving a great impact, although both the shock absorbing base part 18*a* having a certain level of hardness and the shock absorbing flexible part 18*b* having a cushion effect receive the initial shock in parallel fashion, shock absorbing base part 18*a* particularly absorbs the shock, then shock absorbing base part 18*a* bends at middle part 181 in around a middle part of shock-absorbing base part 18*a*, and then shock-absorbing part 18*a* buckles at its bending part near middle part 181 absorbing the load of the impact as it becomes unable to sustain the compressional force, as is illustrated in FIG. 2(*b*) a Subsequently, as a repulsive force of shock-absorbing 18*a* becomes gradually small, shock-absorbing flexible part 18*b* mainly absorbs the compressional force afterwards. Shock absorbing base part 18*a* can be constituted putting shock-absorbing base part 18*a* having a certain level of hardness between two flexible parts having a cushion effect, shock-absorbing flexible parts 18*b* and 18*c*, as shown in FIG. 2 (*c*).

Figure 3:
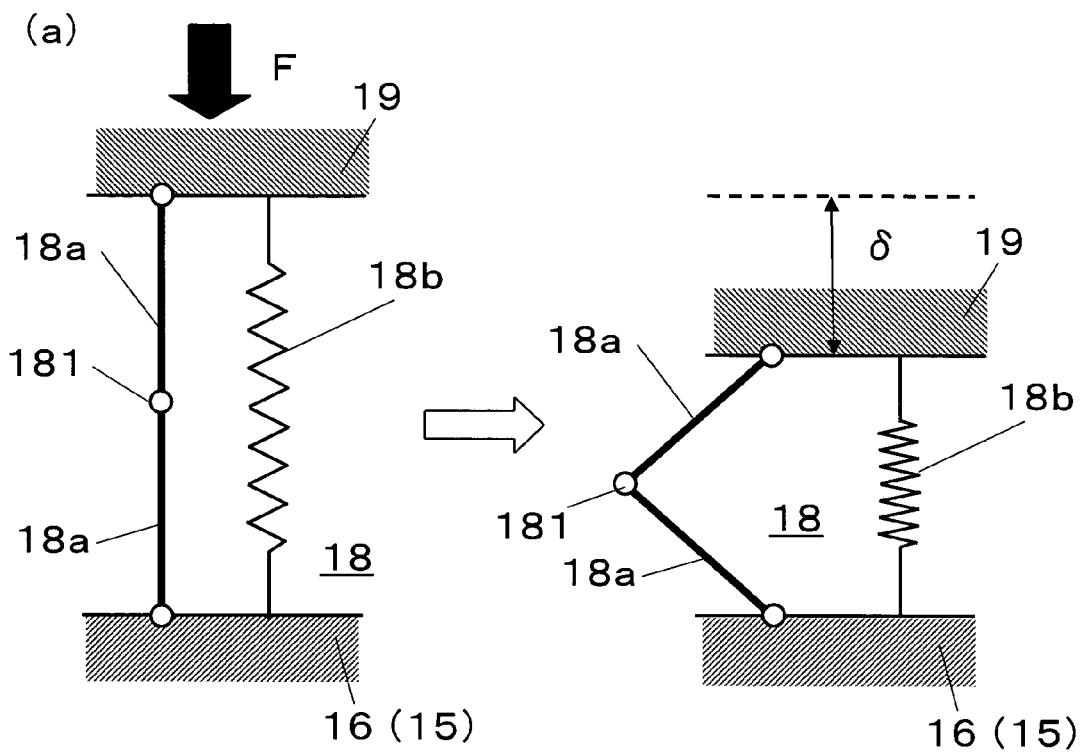
FIG. 3 includes drawings schematically illustrating motions of a shock-absorbing member for an electronic device in the preferred embodiment of the present invention.
Figure 3:
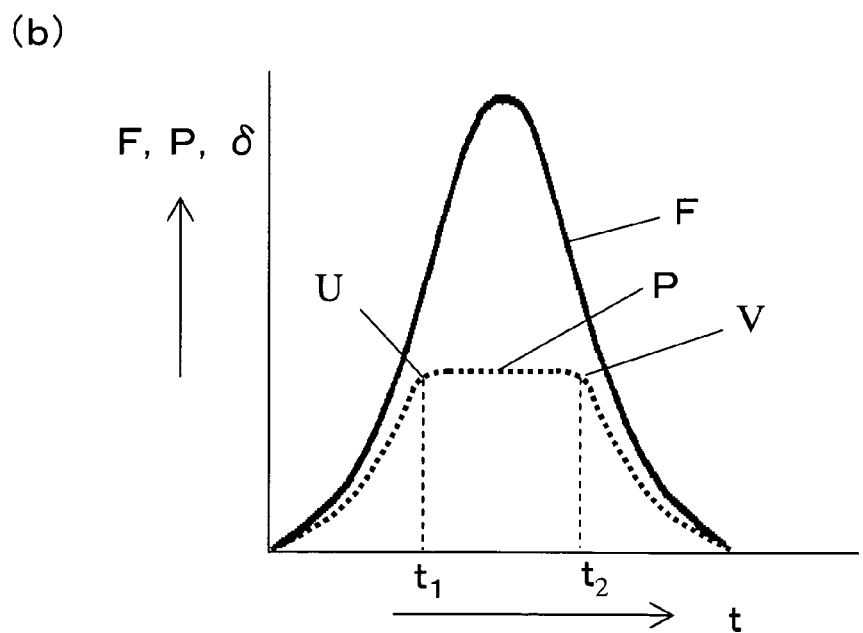

FIG. 3 is a drawing schematically illustrating working mechanism of a shock-absorbing member of an electronic device in the preferred embodiment of the present invention. In FIG. 3(*a*), outer case 19 and upper inner case 15 (or can be lower inner case 16) are disposed in parallel. In the illustration, shock-absorbing member 18 is regarded as a hard material linking middle part 181 of shock-absorbing base part 18, and is represented by a thick solid line. Shock-absorbing flexible part 18*b* is diagrammatically illustrate by a spring. In FIG. 3 (*b*), change of load of impact F applied to shock-absorbing member 18 and changing ratio P of shock-absorbing capability of shock-absorbing member 18, are graphed for a lapse of time. If substantially a large impact force F is applied to outer case 19 of equipment such as by dropping of it, both shock-absorbing base part 18*a* and shock-absorbing flexible part 18*b* elastically deforms at an initial stage of the impact, therefore P the changing ratio of shock-absorbing capability per time keeps changing almost along the line F of load of impact until it hits point U, as illustrated in FIG. 3 (*b*). When impact load F continues increasing, exceeding a marginal point of linear elastic deformation line, shock-absorbing base part 18*a* a hard material starts bending at middle part 181 showing warping deformation. These phenomena can be considered that shock-absorbing base part 18*a* is deforming like bending at middle part 181, making the part a linking point. In this state-of warping deformation, P the changing ratio of shock-absorbing capability per time transits constantly without changing until reaching V in FIG. 3 (*b*).

When the impact load F still increases as to exceed the limit the bending marginal point by the warping deformation of the shock-absorbing base part 18*a*, the shock-absorbing base part can no more sustains the compressional force and buckles at the bending part near the middle part 181, namely, shock-absorbing part 18*a* bends near middle part 181 absorbing the load of the impact, as shown in FIG. 2 (*b*). (This is considered to be a state where shock-absorbing base part 18*a* is deformed being bent at linking middle part 181, as shown in right side figure in FIG. 3 (*a*). At this time, shock-absorbing member 18 is deformed by an amount of deformation δ) Subsequently, since the repulsive force of shock-absorbing base part 18*a* to the impact gradually diminishes and shock-absorbing flexible part 18*b* having cushion effect instead mainly absorbs the impact force, the changing ratio P of shock-absorbing capability gradually diminishes shifting over to right side of V in FIG. 3 (*b*). The situation in that the impact load F is applied to shock-absorbing member 18 and the changing ratio of shock-absorbing capability per time P moves from U to V is explained by the following analogy. When a jack lifts up a weight material, it is heavy in the beginning and a large power is required to lifted up the material, corresponding to a progress of P from the beginning to U in FIG. 3 (*b*), and after the material is lifted up, it requires relatively a small power to sustain the state, corresponding to a progress of P from U to V in FIG. 3 (*b*).

As it has been explained, the shock-absorbing member in the exemplary embodiment of the present invention is constituted by an integrated unit of the shock-absorbing base part composed of a material having a certain degree of hardness and a flexibility and the shock-absorbing flexible part composed of a very flexible material having a cushion absorbing capability into a unit, and when a large impact is applied, the shock-absorbing member absorbs the impact force by bending the shock-absorbing base part at the middle part and buckling it at the bending part of it, absorbing the shock of the impact. In order to have the shock-absorbing base part buckle without failing at its middle part upon receipt of substantially a large impact, the shock-absorbing base part may be provided with a hole, a cut, or a notch.

Figure 4:
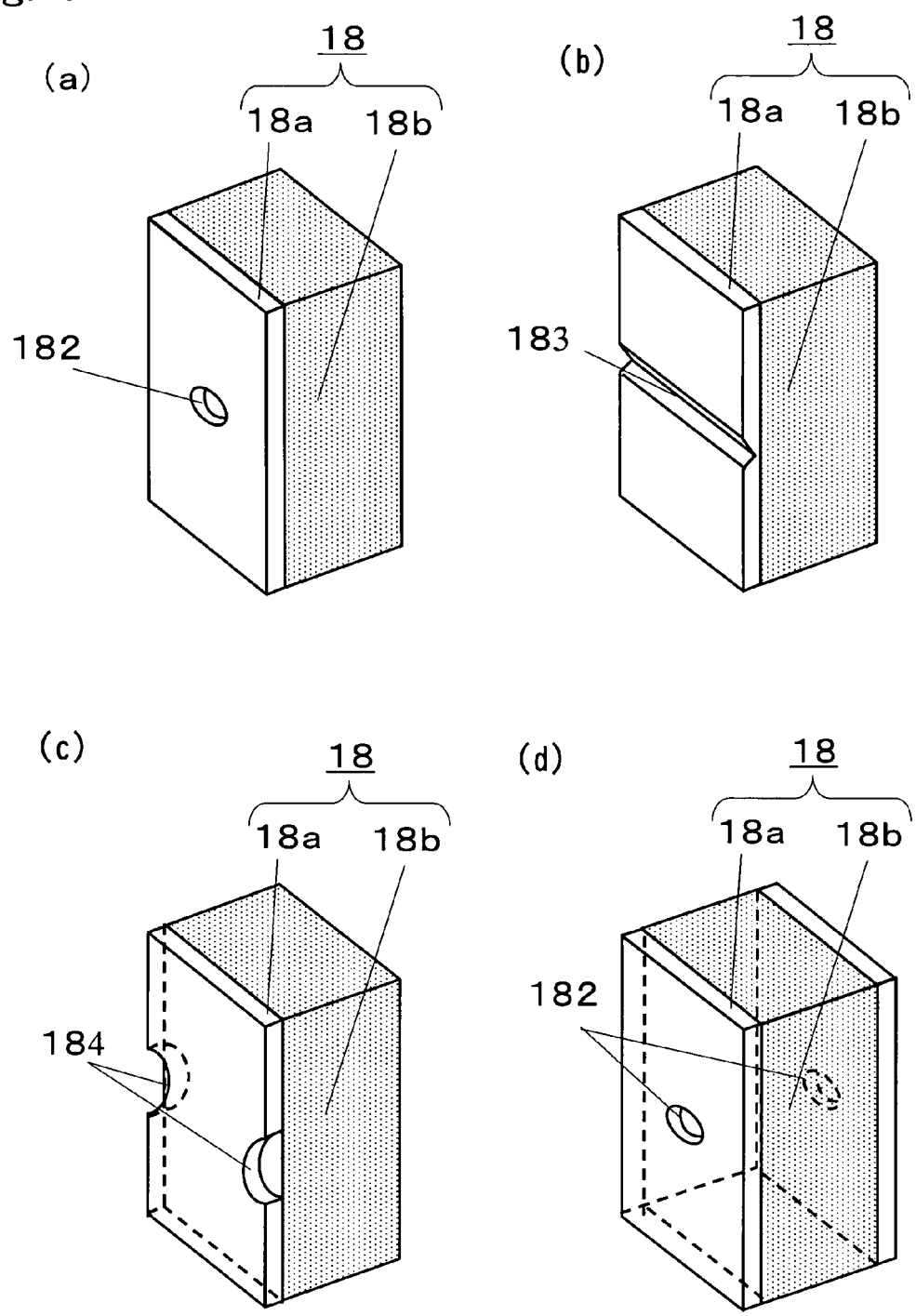
FIGS. 4 (a),(b),(c),(d) are perspective views of shock-absorbing members having other constitution to be used for a magnetic disk drive in the preferred embodiment of the present invention.

For examples, it is possible to ensure the buckling by providing the base part with hole 182 in shape of hole in the middle part of shock-absorbing base part 18*a* of shock-absorbing member 18, as shown in FIG. 4 (*a*). In order to ensure the buckling, it is also possible to provide cut 183 in a wedge shape in the middle part of shock-absorbing base part 18a of shock-absorbing member 18 in vertical direction to the longer sides of the member, as shown in FIG. 4 (*b*), as well as providing notch 184 in a semicircle shape in the middle part of shock-absorbing base part 18a of shock-absorbing member 18, as shown in FIG. 4 (*c*). Such shock-absorbing member 18 can also be constituted by putting shock-absorbing flexible part 18b having a cushion effect between two shock-absorbing base parts 18a having a certain degree of hardness and provided with hole 182 in round shape, and integrally molding them forming a unit, as is shown in FIG. 4 (*d*). In this case, both of two pieces of shock-absorbing base parts 18a may have a cut or a notch. Shape of the hole, of the cut and the notch is not limited to the ones shown in FIG. 4, but a cut of half-cylindrical in its cress section and a notch in triangular are allowed.

Figure 5:
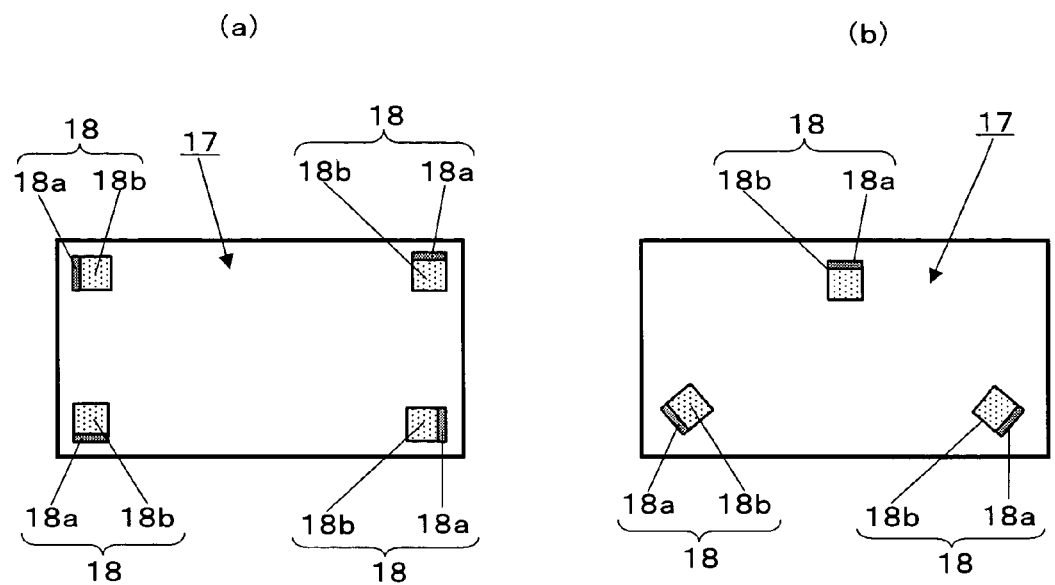
FIGS. 5 (a),(b) are schematic top views of showing arrangement of a plurality of shock-absorbing members disposed on a face of a disk drive main body in the preferred embodiment of the present invention.

In FIG. 1, shock absorbing members 18 fitted to surfaces of magnetic disk drive main body 17 are shown in which the joint planes of the shock-absorbing member which is made integrally molding shock absorbing base part 18a and shock absorbing flexible part 18b are positioned in parallel each other, however disposition of the member is not limited to this configuration. For examples, a plurality of shock absorbing members 18 can be arranged so as at least one joint plane of shock-absorbing members 18 integrally made by molding shock-absorbing base part 18a and shock-absorbing flexible part 18b may be nearly vertical to or in an angle of 60° to 120° to one of the other joint plane of adjacent shock-absorbing members, which is shown in FIG. 5. In the arrangement of shock absorbing members 18 shown in FIG. 1, when an impact force having a component force is applied practically in a vertical direction to the integrally molded mating face of shock absorbing base part 18a and shock absorbing flexible part 18b, or when shock-absorbing base part 18a of shock-absorbing member 18 is not vertically abutted onto magnetic disk drive main body 17, there is a possibility that shock-absorbing member 18 receiving the impact force does not buckle in near the middle part of shock absorbing base part 18a, the shock absorbing member 18 becomes like falling down unable to fully exhibit its shock absorbing capability. However, by using the arrangement of shock absorbing members 18 shown in FIG. 5, such state like falling down of the shock absorbing member 18 is prevented from occurring because shock-absorbing member 18 buckles in the near middle of the shock absorbing base part 18a, proving a preferable arrangement of the members which exhibits the shock absorbing capability. The number of shock absorbing member 18 fitted to a surface is not limited to three or four pieces, but preferably at least three shock absorbing members 18 are attached as shown in FIG. 5.

Figure 6:
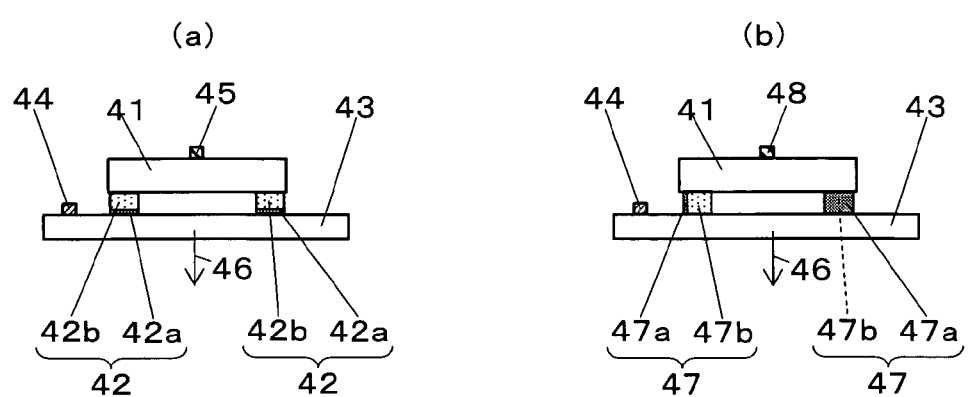
FIG. 6 (a) is a schematic side view illustrating an example of a method for examining effects of shock-absorbing by using an arrangement of conventional shock-absorbing members.

Next, effects of the shock absorbing member are described by showing experimental results. Two kinds of shock-absorbing members having a different constitution were prepared for the experiment. One is a shock-absorbing member 42 in conventional constitution, in which shock-absorbing base part 42a of shock absorbing member 42 is bonded to one of an outside surface of magnetic disk drive main body (dummy unit 41) and an inside surface of outer case (stand 43), and shock absorbing member 42b is bonded to the other surface, so that the shock absorbing base part 42a and shock absorbing flexible part 42b are disposed in series. Another is shock absorbing member 47 in the preferred embodiment of the present invention, in which shock-absorbing base part 47a and shock-absorbing flexible part 47b are disposed in parallel. These constitutions are shown in FIG. 6. Differences of shock-absorption in the two constitutions were examined, and obtained results are shown in FIG. 7.

FIG. 6 (*a*) is a schematic side-view showing an example of shock absorbing effects examining method in the conventional arrangement of shock absorbing members. FIG. 6 (*a*) shows the shock absorbing method, in which shock absorbing flexible part 42b of the shock absorbing member 42 is bonded to dummy unit 41 corresponding to a magnetic disk drive, and shock absorbing base part 42a is bonded to a surface of stand 43 corresponding to an outer case, thereby shock absorbing base part 42a and shock absorbing flexible part 42b of the shock absorbing member 42 are disposed in series. Accelerometer 44 is placed on top of stand 43 which is corresponded to the outer case, and accelerometer 45 is placed on top of dummy unit 41 corresponded to the magnetic disk drive placed through shock-absorbing member 42. With this arrangement, stand 43 is dropped from a height of 100 cm in a direction of arrow 46, and change of shock absorption by the lapse of time is recorded by accelerometer 44 and accelerometer 45.

FIG. 6 (*b*) is a schematic side view showing an example of shock-absorbing effects examining method by the arrangement of shock-absorbing members in the preferred embodiment of the present invention. In this shock absorbing method, shock absorbing members 47 are arranged between stand 43 and dummy unit 41 in a way as shown in FIG. 5(*a*), and in which shock-absorbing member 47 is arranged so that shock-absorbing base part 47a and shock-absorbing flexible part 47b are disposed in parallel. In identical to FIG. 6 (*a*), accelerometer 44 is placed on stand 43 corresponding to the outer case, and accelerometer 48 is placed on dummy unit 41 corresponding to the magnetic disk drive placed through shock-absorbing member 47. With this arrangement, stand 43 is also dropped from a height of 100 cm in the direction of arrow 46, and change of shock absorption by the lapse of time is recorded by accelerometer 44 and accelerometer 48. Height of shock absorbing member 47 (dimension between stand 43 and dummy unit 41) is same that of shock absorbing member 42 in FIG. 6 (*a*).

Figure 7:
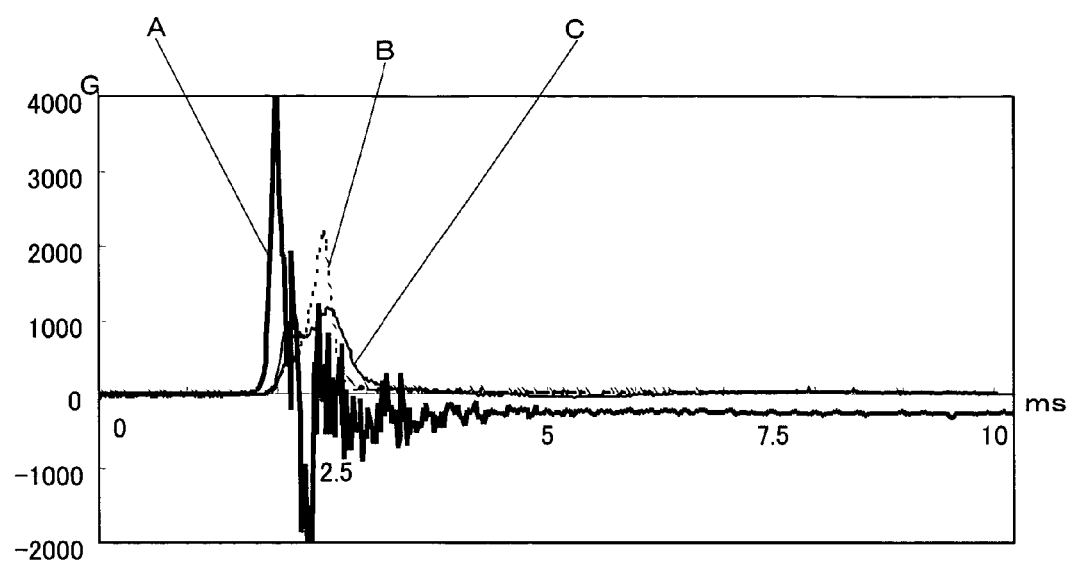
FIG. 7 is a graph showing changes of shock absorption by the lapse of time.

FIG. 7 shows results obtained with these constitutions, and the graph shows changes of shock absorption by the lapse of time. In the graph, ordinate axis stands for G value an output of the accelerometer, and abscissa axis stands for a lapse of time. In FIG. 7, curve A (a curve shown by a thick solid line) shows a change of impact force applied to stand 43 which corresponds to the outer case, i.e., change of value G given by accelerometer 44 installed on stand 43 which corresponds to the outer case. Curve B (a curve shown by a broken line) shows changes of shock absorption by the lapse of time that dummy unit 41 corresponding to the magnetic disk drive main body received in the conventional shock absorbing method where shock-absorbing members 42 is used in series fashion as in FIG. 6 (*a*), that is changes of G value output by accelerometer 45 installed on dummy unit 41 corresponding to the magnetic disk drive. Curve C (a curve shown by a thin solid line) represents a change of shock absorption by the lapse of time that dummy unit 41 replacing the magnetic disk drive main body received in the shock absorbing method where shock absorbing members 47 in the preferred embodiment of the present invention are used in parallel fashion, as shown in FIG. 6 (*b*), that is change of G value output by accelerometer 48 installed on dummy unit 41 replacing the magnetic disk drive main body.

In FIG. 7, the curve B, which represents the change of shock absorption of the shock absorbing members 42 in time in the conventional constitution, shows in FIG. 6 (*a*) that shock absorbing capability of flexible part 42b effectively exerts its shock absorbing capability in the beginning stage of receiving shocks showing its shock absorbing capability in early stage, however, since the impact force is very large, the shock absorbing flexible part 42b is greatly deformed by the impact and increases its resilient repulsing force with lapse of time, therefore value G that dummy unit 41 corresponding to a magnetic disk drive main body receives is increased. Finally, state of the shock-absorption becomes almost identical to that of a rigidity contact (so-called "bottoming"), and most of the shock absorbing capability is lost. On the other hand, in the constitution in the preferred embodiment of the present invention where absorbing members 47 are arranged as in case of FIG. 6(b), shock absorbing base part 47a and shock absorbing flexible part 47b receive a shock in parallel at the initial stage of receiving the impact, and shock-absorbing base part 47a mainly exhibits its elastic repulsive force against the impact. As value G of the impact increases, shock absorbing base part 47a is buckled unable to endure the compressive force and lose its elastic repulsive force, then shock absorbing flexible part 47b starts receiving the compressional force in placing of shock absorbing base part 47a, as graphed by curve C in FIG. 7. Thus, in this constitution, the compressional force is received for a longer period of time, therefore the shock absorbing effect of this method is proved to be greater than that of the conventional shock absorbing method in which shock absorbing members 42 are used in series.

In FIG. 7, the curve A shows that the maximum value is about 4000 G (the G value is about 8000 G in actual, but in curve A it is filtered down to about 4000 G). The curve B shows that a maximum impact value (G value) that dummy unit 41 (magnetic disk drive) receives in the conventional constitution of shock absorbing members 42 is about 2200 G, whereas the maximum impact value (G value) of dummy unit 41 (magnetic disk drive) with the constitution of shock absorbing members 47 in the preferred embodiment of the present invention is about 1200 G as shown by curve C, which is as low as nearly 55% of the value of the convention constitution and an effectiveness of shock absorbing members 47 used in parallel fashion is proved. This shock absorbing process works similarly to either direction of an impact shown by arrow marks E and D in FIG. 1, and a similar effect is obtained regardless the direction of the impact.

Figure 8:
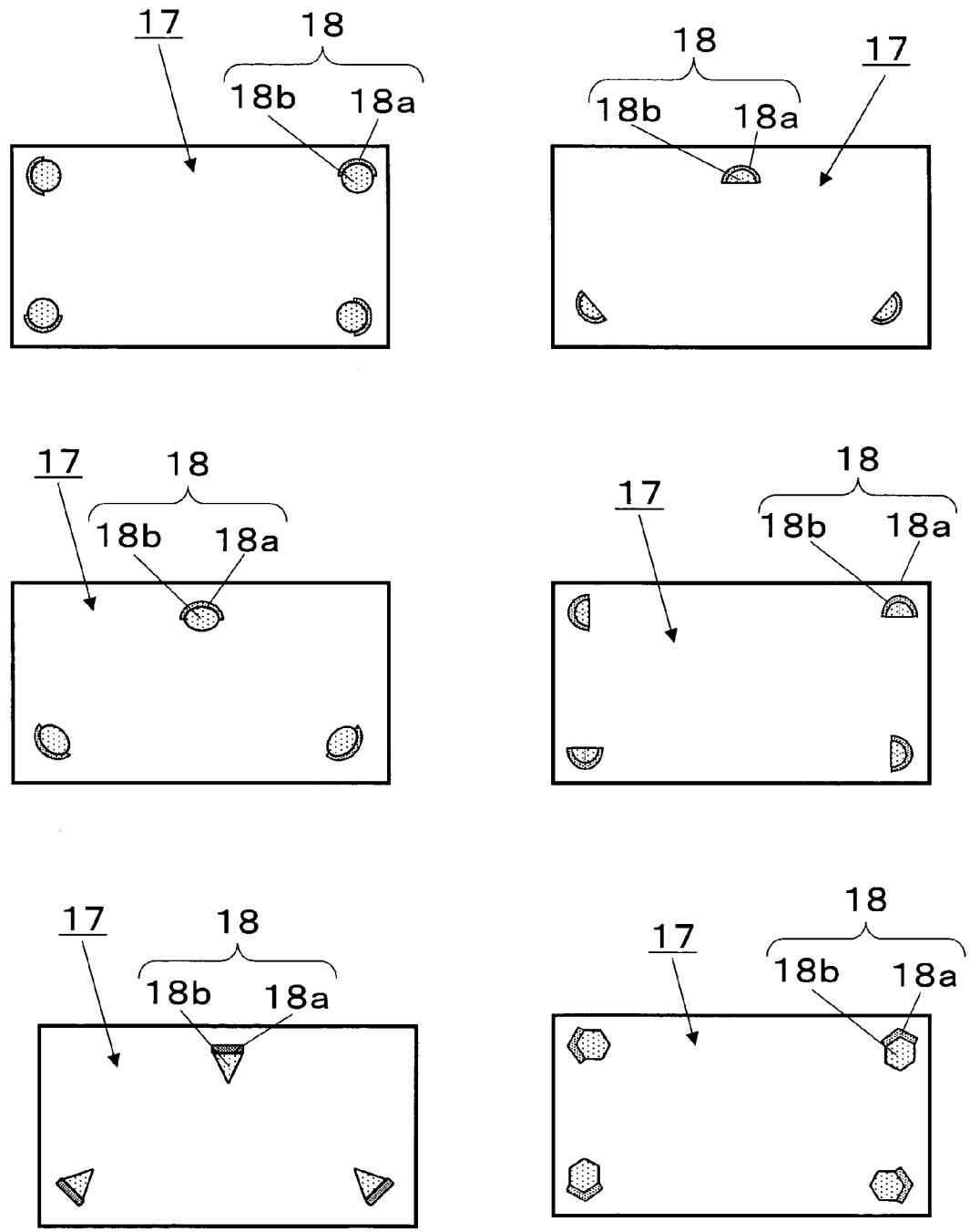
FIG. 8 shows examples of possible shape and arrangement of shock-absorbing members usable in the present invention.
Figure 9:
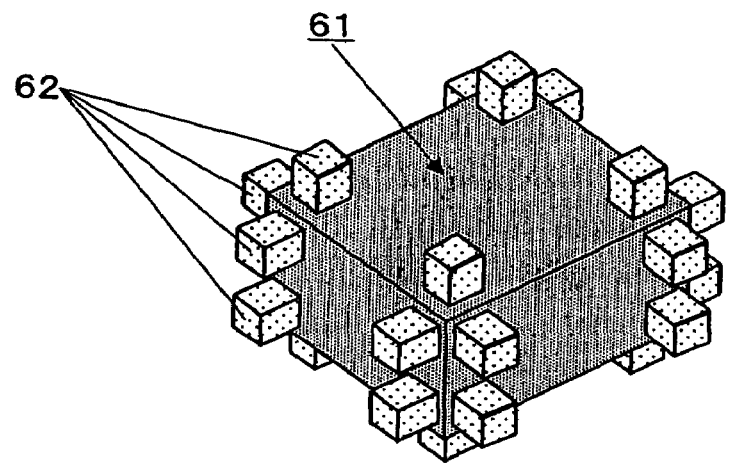
FIG. 9 (a) is a perspective view showing a main body of an electronic device and a shock-absorbing member bonded on the main body in conventional electronic equipment.
Figure 9:
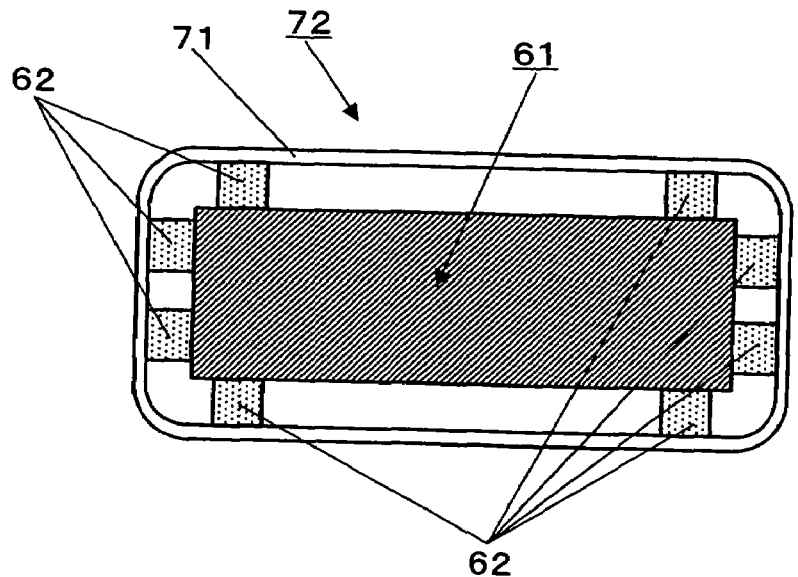
Figure 10:
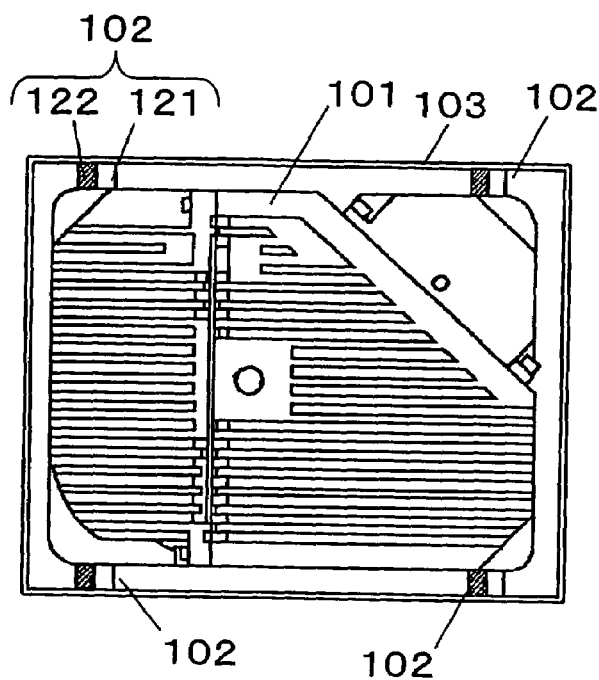
FIG. 10 (a) is a plain view showing an outer case is fixed to an electronic device main body through other conventional shock-absorbing members in electronic equipment.
Figure 10:
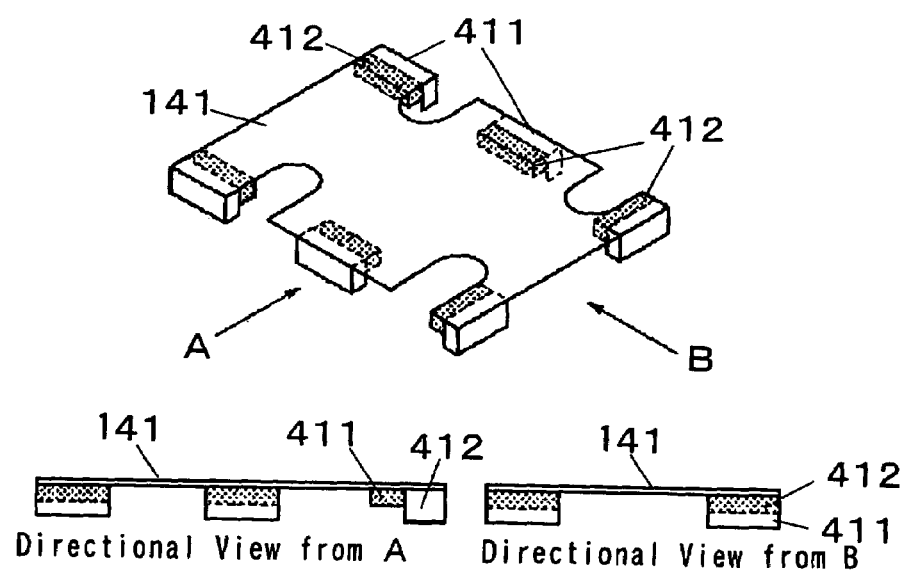

In the above description and the drawing, the shock absorbing member in cuboid shape is explained as an example. However, the shape of the shock absorbing member of the present invention is not limited to the cuboid shape, and shock-absorbing member in various shape can be used, in shape such as of cylinder, half-cylinder, oval cylinder, half-oval cylinder, and polygonal prism shown in FIG. 8. Such shock-absorbing members can be composed integrally molding or bonding a shock absorbing flexible part—a highly soft material having a cushion capability and formed into a relatively long shape such as in one of shapes of cylinder, half-cylinder, oval cylinder, half-oval cylinder, and polygonal prism, and a shock absorbing base part—a thin-plate sheet made from resin material having a certain level of hardness and flexibility, such as polyethylene, and cutting into a certain size of width and thickness. When manufacturing the shock-absorbing member, it is preferable that the shock-absorbing base part is bonded to a portion in less than half of peripheral diameter or perimeter of the shock absorbing flexible part. In FIG. 8, three pieces or four pieces of shock absorbing members in different shape are arranged as examples to be disposed a main body of electronic equipment, but combination other than these examples can be selected without a problem.

In the above preferred embodiment of the present invention, a magnetic disk drive is described as an example of for explanation, but embodiment of the present invention is not limited to the magnetic disk drive, and the invention is applicable to an optical disk drive, an optical-magnetic disk drive, or to other electronic devices to be used as portable equipment.

If an extremely large impact load is applied as the shock-absorbing base part of the shock-absorbing member has to buckle for absorbing the impact, the shock-absorbing capability of the shock-absorbing member becomes insufficient. In case of it, it is advisable a sensor detecting buckling of a shock-absorbing member is attached to the shock-absorbing member. A countermeasure is taken by equipping electronic equipment with a displaying system which urges replacement of the shock-absorbing member based on the signal indicating the buckle of the member.

As described above, the shock-absorbing method and the electronic device using the method are realized in the preferred embodiment of the present invention. In the method, the electronic device is enabled to have a smaller shock-absorbing effect but relatively a larger shock-repulsive power at an initial stage of receiving the impact, a larger shock repulsive power but smaller shock-absorbing effect after a lapse of specified time period, thereby the electronic device is enabled to receive a compressional force for relatively a long period of time, when subjected to a great impact such as dropping of the device in portable use. Accordingly, even if the device is subjected to any harsh impact, the device is prevented from getting a serious damage, and an outstanding shock absorbing capability is provided.

EXPLANATION OF INDUSTRIAL APPLICABILITY OF INVENTION

As described above, the present invention comprises a shock-absorbing member, a shock absorbing method and an electronic equipment utilizing those. The shock-absorbing member is composed of a shock absorbing base part and a shock-absorbing flexible part, in which thickness of the shock-absorbing base part is smaller than that of the shock-absorbing flexible part and the shock-absorbing base part buckles at its bending part when receiving an impact. A plurality of such shock-absorbing members is disposed between an electronic device main body and an outer case, or at least three pieces of the shock-absorbing members are placed between faces of an outside of the electronic device main body and an inside of the outer case.

The invention realizes a large effect by providing a shock-absorbing member having a superb shock-absorbing capability which, even when subjected to a very large impact, endures a compressional force substantially a long period of time, helps to decrease the impact the main body of electronic equipment receives to substantially a small one, and avoids a serious damage to the main body of electronic equipment; and a shock-absorbing method of electronic equipment utilizing the member.

The electronic equipment employing the shock-absorbing member and the shock-absorbing method is provided with a large shock-absorbing capability. The main body of equipment is prevented from receiving a large compressional force, and is avoided from a fatal damage is caused.

What is claimed is:

1. A shock-absorbing member disposed on a main body of equipment, and comprising a shock-absorbing base part and a shock-absorbing flexible part,
wherein the shock-absorbing base part has a thickness smaller than that of the shock-absorbing flexible part, and the shock-absorbing base part buckles so as to absorb a shock when receiving an impact.

2. The shock-absorbing member according to claim 1, wherein the shock-absorbing base part forms a bending part which is vertical to the shock direction, and starts buckling at the bending part of the shock-absorbing base part so as to absorb a shock when receiving an impact.

3. The shock-absorbing member according to claim 1, wherein the shock-absorbing base part and the shock-absorbing flexible part are disposed so that their long sides are substantially in parallel with a direction of an impact force.

4. The shock-absorbing member according to claim 1, wherein the shock-absorbing base part and the shock-absorbing flexible part are integrally molded forming a unit.

5. The shock-absorbing member according to claim 1, wherein the shock-absorbing base part is narrow in a direction of its effective width which is vertical to long side of the shock-absorbing base part.

6. The shock-absorbing member according to claim 1, wherein the shock-absorbing base part is thin in a direction of its effective thickness which is vertical to long side of the shock-absorbing base part.

7. The shock-absorbing member according to claim 1, wherein the shock-absorbing base part has a hardness higher than that of the shock-absorbing flexible part.

8. An electronic device having a shock-absorbing member which is composed of a shock-absorbing base part and a shock-absorbing flexible part and is disposed outside a main body of the device,
wherein the shock-absorbing base part has a thickness smaller than that of the shock-absorbing flexible part, and the shock-absorbing base part buckles so as to absorb a shock when receiving a shock of impact.

9. The electronic device according to claim 8, wherein the shock-absorbing base part forms a bending part which is vertical to the shock direction, and starts buckling at the bending part of the shock-absorbing base part so as to absorb a shock when receiving an impact.

10. The electronic device according to claim 8, wherein a long side of the shock absorbing member composed of the shock-absorbing base part and the shock-absorbing flexible part is disposed substantially in parallel with a direction in which an impact force is applied.

11. The electronic device according to claim 9 employing the shock-absorbing member,
wherein the shock-absorbing member is formed by integrally molding the shock-absorbing base part and the shock-absorbing flexible part.

12. The electronic device according to claim 8 employing the shock absorbing member,
wherein the shock-absorbing base part is narrow in a direction of its effective width which is vertical to long side of the shock-absorbing base part.

13. The electronic device according to claim 8 employing the shock absorbing member,
wherein the shock-absorbing base part is thin in a direction of its effective thickness which is vertical to long side of the shock-absorbing base part.

14. The electronic device according to claim 8 employing the shock-absorbing member,
wherein the shock-absorbing base part has a hardness higher than that of the shock-absorbing flexible part.

15. The electronic device according to claim 8, wherein at least 3 pieces of the shock-absorbing member are disposed between a plane of a main body of the device and a plane of an outside constituent member facing the device.

16. The electronic device according to claim 8,
wherein the shock-absorbing members are disposed between a plane of main body of the device and a plane of an outside constituent member facing the device,
wherein an angle the planes are vertically making to a joint plane between the shock-absorbing base part and the shock-absorbing flexible part of an adjacent shock-absorbing member is 60° at least and 120° at most.

17. The electronic device according to claim 8,
wherein the shock-absorbing member is affixed to one of an outside face of the main body of the device and an inside face of the outer case.

18. The electronic device according to claim 17,
wherein the shock-absorbing member is in one of shapes of cuboid, cylinder, half-cylinder, oval-cylinder, half-oval cylinder, and polygonal prism,
wherein a face of the shock-absorbing member having the shock-absorbing base part is in parallel with the joint plane between the shock-absorbing base part and the shock-absorbing flexible part.

19. The electronic device according to claim 18,
wherein the face of the shock-absorbing member having the shock-absorbing base part is at a boundary of the shock-absorbing member, and an outside peripheral diameter or an outside perimeter of the face is smaller than half an outside peripheral diameter or an outside perimeter of the shock-absorbing member.

20. A shock-absorbing method of an electronic device including a shock-absorbing member formed by integrally molding a shock-absorbing base part and the shock-absorbing flexible part,
wherein the shock-absorbing base part is thinner than the shock-absorbing flexible part, and the shock-absorbing base part buckles so as to absorb a shock when receiving an impact.

21. The shock-absorbing method according to claim 20,
wherein the shock-absorbing base part forms a bending part which is vertical to the shock direction, and starts buckling at the bending part of the shock-absorbing base part so as to absorb a shock when receiving an impact.

22. The shock-absorbing method of an electronic device according to claim 20,
wherein, when the shock-absorbing member absorbs the shock of the impact by buckling the shock-absorbing base part, the shock-absorbing base part bucks and absorbs the shock of the impact at an initial stage of receiving the impact, then the shock-absorbing flexible part mainly absorbs the shock.

23. The shock-absorbing method of an electronic device according to claim 18,
wherein the shock-absorbing members are disposed between a plane of main body of the device and a plane of an outside constituent member facing the device, so as an angle the planes vertically making to a joint plane between the shock-absorbing base part and the shock-absorbing flexible part of an adjacent shock-absorbing member becomes 60° at least and 120° at most.

24. The shock-absorbing member according to claim 2, wherein the bending part of the shock-absorbing base part is at about the middle part of the shock-absorbing base part.

25. The shock-absorbing member according to claim 9, wherein the bending part of the shock-absorbing base part is at about the middle part of the shock-absorbing base part.

26. The shock-absorbing member according to claim 21, wherein the bending part of the shock-absorbing base part is at about the middle part of the shock-absorbing base part.

* * * * *